United States Patent
Tam et al.

(10) Patent No.: US 11,320,887 B2
(45) Date of Patent: May 3, 2022

(54) CONTROLLING OPERATIONS OF CAMERAS BASED ON POWER STATE TRANSITIONS

(71) Applicant: HEWLETT-PACKARD DEVELOPMENT COMPANY, L.P., Houston, TX (US)

(72) Inventors: Alan Man Pan Tam, Houston, TX (US); Hui Leng Lim, Houston, TX (US); Ann Alejandro Villegas, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 866 days.

(21) Appl. No.: 16/076,217

(22) PCT Filed: Jul. 6, 2017

(86) PCT No.: PCT/US2017/040790
§ 371 (c)(1),
(2) Date: Aug. 7, 2018

(87) PCT Pub. No.: WO2019/009895
PCT Pub. Date: Jan. 10, 2019

(65) Prior Publication Data
US 2021/0200294 A1    Jul. 1, 2021

(51) Int. Cl.
*G06F 3/038*    (2013.01)
*G06F 1/3234*    (2019.01)

(52) U.S. Cl.
CPC ......... *G06F 1/325* (2013.01); *G09G 2330/02* (2013.01)

(58) Field of Classification Search
USPC ..... 345/156, 204, 174; 715/34, 764; 348/43, 348/47, 222.1; 713/320; 455/26.1
See application file for complete search history.

(56) References Cited

U.S. PATENT DOCUMENTS

| | | | |
|---|---|---|---|
| 7,224,394 B2 | 5/2007 | Shimamura | |
| 7,786,770 B1 | 8/2010 | Liang et al. | |
| 8,797,451 B2 | 8/2014 | Bilbrey | |
| 2008/0080850 A1 | 4/2008 | Amirzadeh et al. | |
| 2008/0304819 A1 | 12/2008 | Tolbert | |
| 2012/0009896 A1* | 1/2012 | Bandyopadhyay | G06F 3/04847 715/764 |

(Continued)

FOREIGN PATENT DOCUMENTS

| | | |
|---|---|---|
| CN | 102998828 B | 7/2015 |
| EP | 2635020 | 9/2013 |
| WO | 2013144966 A1 | 10/2013 |

OTHER PUBLICATIONS

"Does Anyone Know a Way to Have Privacy Mode Defaulted Off for Cam on a Lenovo Laptop?", Sysnative, Retrieved from internet—https://www.sysnative.com/forums/windows-10-a/19699-does-anyone-know-way-have-privacy-mode-defaulted-off-cam-lenovo-laptop.html, May 19, 2017, 5 Pages.

*Primary Examiner* — Thuy N Pardo
(74) *Attorney, Agent, or Firm* — Trop, Pruner & Hu P.C.

(57) ABSTRACT

A technique includes detecting a power transition of a processor-based system and controlling operation of a camera of the processor-based system based on the detection of the power transition. Controlling the operation of the camera includes triggering a process to disable the camera in response to detection of the power transition.

20 Claims, 8 Drawing Sheets

(56) References Cited

U.S. PATENT DOCUMENTS

| | | | |
|---|---|---|---|
| 2013/0062536 A1* | 3/2013 | Bardos | G01N 21/6489 250/459.1 |
| 2013/0286163 A1* | 10/2013 | Dror | H04N 13/341 348/47 |
| 2014/0132715 A1* | 5/2014 | Raghoebardayal | G06T 17/20 348/43 |
| 2014/0189395 A1* | 7/2014 | KP | G06F 1/3218 713/320 |
| 2014/0336723 A1* | 11/2014 | Ben-Ezra | A61N 1/36025 607/45 |
| 2014/0359454 A1* | 12/2014 | Lee | G06F 3/048 715/734 |
| 2015/0050916 A1* | 2/2015 | Bandyopadhyay | G06F 21/36 455/26.1 |
| 2016/0021303 A1* | 1/2016 | Sutton | H04N 5/23267 348/222.1 |
| 2016/0103495 A1* | 4/2016 | Takatsuka | G06F 3/041 345/156 |
| 2017/0070606 A1* | 3/2017 | Bandyopadhyay | H04L 63/0861 |
| 2018/0027307 A1* | 1/2018 | Ni | H04N 21/44218 345/419 |
| 2018/0255622 A1* | 9/2018 | Spero | F21S 41/143 |
| 2018/0286201 A1* | 10/2018 | Lemberger | H04W 60/04 |
| 2018/0314340 A1* | 11/2018 | Burr | G06V 40/161 |
| 2019/0278940 A1* | 9/2019 | Huang | G06F 21/575 |

* cited by examiner

CONTROLLING OPERATIONS OF CAMERAS BASED ON POWER STATE TRANSITIONS

BACKGROUND

Electronic devices that include cameras, such as cellular telephones, tablet computers, watches, monitors, web cameras, and so forth, may potentially expose users of the electronic devices to unauthorized observation, or spying. For example, an electronic device may have a camera and a network interface through which a remote hacker may access the camera and view images of the electronic device's surrounding environment without a user of the electronic device being aware of this activity.

DETAILED DESCRIPTION

Figure 1:
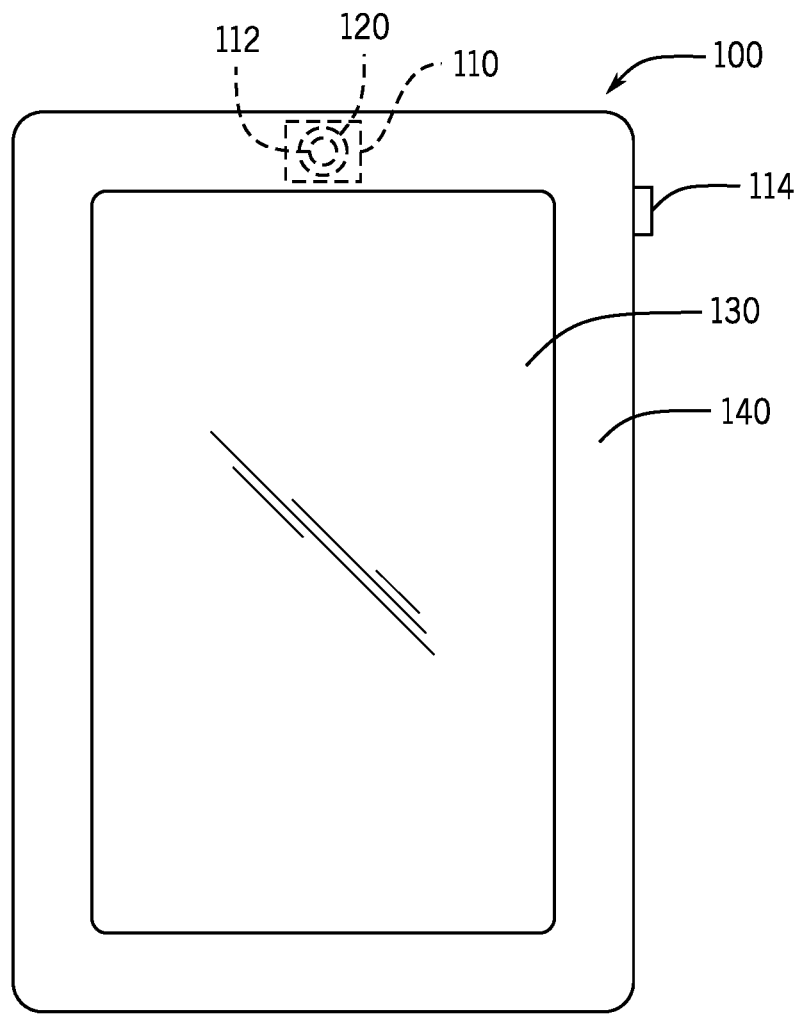
FIG. 1 is a perspective view of an electronic device according to an example implementation.

Cameras are ever increasingly being incorporated into electronic devices, such as portable electronic devices (cellular telephones, watches, tablet computers, and so forth), desktop computers, monitors, and so forth. It is possible that a hacker may access a camera on a user's electronic device and spy on the user without the user's knowledge. The electronic device may therefore have a camera privacy solution, such as a solution in which the user may, for example, depress a key or button to toggle the electronic device between a private or non-private mode of operation. The user may, for example, place the electronic device in the non-private mode of operation for purposes of using the electronic device for camera-related operations, such as operations involving filming video, snapping still shots, teleconferencing and so forth. However, when the user is not performing a camera-related operation on the electronic device, the user may place the device in the private mode of operation in which a software or mechanical camera shutter is activated to effectively disable the camera.

An electronic device may power down unexpectedly due to a number of possible events. For example, the electronic device may experience a software error-related failure (i.e., a software "crash"), the electronic device may lose electrical power, a battery of the electronic device may become completely discharged, and so forth. When this occurs, the camera's privacy solution may not be effective, as the electronic device may enter a transition state in which the privacy mode of operation of the camera is unknown or uncontrolled. The interim period between when the electronic device unexpectedly loses power and then resumes normal operation may create a spying opportunity.

In accordance with example implementations that are described herein, an electronic device includes a camera privacy mode system that disables use or operation of the camera during power state transitions of the electronic device. The camera privacy mode system includes a power management controller, or power manager, which provides a power state signal. The camera privacy mode system monitors the power state signal so that when the power state signal indicates, or represents, a certain power state transition (a power state transition from a fully powered on state to a power state associated with less power consumption, for example), the camera privacy mode system responds by automatically disabling use of the camera, thereby preventing unauthorized use of the camera during the power transition.

In accordance with example implementations, the camera privacy mode system may control a shutter, such as an active glass cell, for the camera. The active glass cell has two states: a transparent state for purposes of enabling operation of the camera (i.e., a state in which the active glass cell allows light to pass through the camera lens) and an opaque state, which disables operation of the camera (i.e., a state in which the cell blocks light from entering the camera lens). More specifically, the camera privacy mode system may respond to edge transitions of a power state signal that is furnished by the power manager to initiate, or trigger, a process in which the camera privacy mode system automatically places the cell in a default, opaque state when a power state transition of the electronic device is detected. Moreover, the electronic device may contain a key or button (a button or key that controls a mechanical switch, for example), for purposes of allowing the user to otherwise select the privacy or non-privacy mode of operation for the camera.

As a more specific example, FIG. 1 depicts an electronic device 100 in accordance with example implementations. Although FIG. 1 depicts the electronic device 100 being a tablet computer, the electronic device 100 may be an electronic device other than a tablet computer, in accordance with further example implementations. For example, in accordance with some implementations, the electronic device may be a wearable electronic device, such as a watch, or a portable electronic device, such as a cellular telephone or a notebook computer. As other examples, the electronic device may be a relatively non-portable electronic device, such as a desktop computer, or a stand-alone display, or monitor. Moreover, depending on the particular implementation, the electronic device may include a central processing unit (CPU), i.e., the electronic device may be a processor-based device; or the electronic device may contain hardware that does not include a CPU. As further examples, the electronic device may be a web camera, a drone or a toy.

Regardless of its particular form, the electronic device 100, in accordance with example implementations, includes a camera 110 and a camera privacy system for purposes of controlling operation or use of the camera 110. For the specific example implementation of FIG. 1, the electronic device 100 includes a shutter 120, which may be closed by the electronic device 100 when the electronic device 100 transitions between power states. For the specific implementation of FIG. 1, the electronic device 100 includes a bezel 140, which includes an opening 112 to allow light to enter a lens of the camera 110; and the shutter 120 may be controlled by the electronic device for purposes of allowing or blocking light through the opening 112 to correspondingly enable or disable use or operation of the camera 110. As further described herein, the operation or use of the camera 110 may be controlled using mechanisms other than a shutter that controls when light passes through the camera's lens.

Among its other features, in accordance with some implementations, the electronic device 100 may include a display screen 130 and a key or button 114, which the user may operate for purposes of controlling whether the camera 110 is in a privacy mode of operation or in a non-privacy mode of operation. In this manner, in accordance with some implementations, the button 114 may a momentary button that operates a mechanical toggle switch, which the user may depress to toggle between the privacy and non-privacy modes of operation. Moreover, in accordance with example implementations, for the particular implementation of FIG. 1, the user may observe whether the lens opening 112 is opaque or transparent for purposes of receiving a visual indication of whether the camera 110 is in the privacy or non-privacy mode of operation.

It is noted that in accordance with further example implementations, a device other than a mechanical button or key may be used for purposes of allowing the user to select the privacy and non-privacy modes of operation. For example, in accordance with further example implementations, the electronic device 100 may have one or multiple graphical user interface (GUI)-based buttons, which the user may select (by touching the display screen 130) to select whether the shutter is open or closed.

Figure 2:
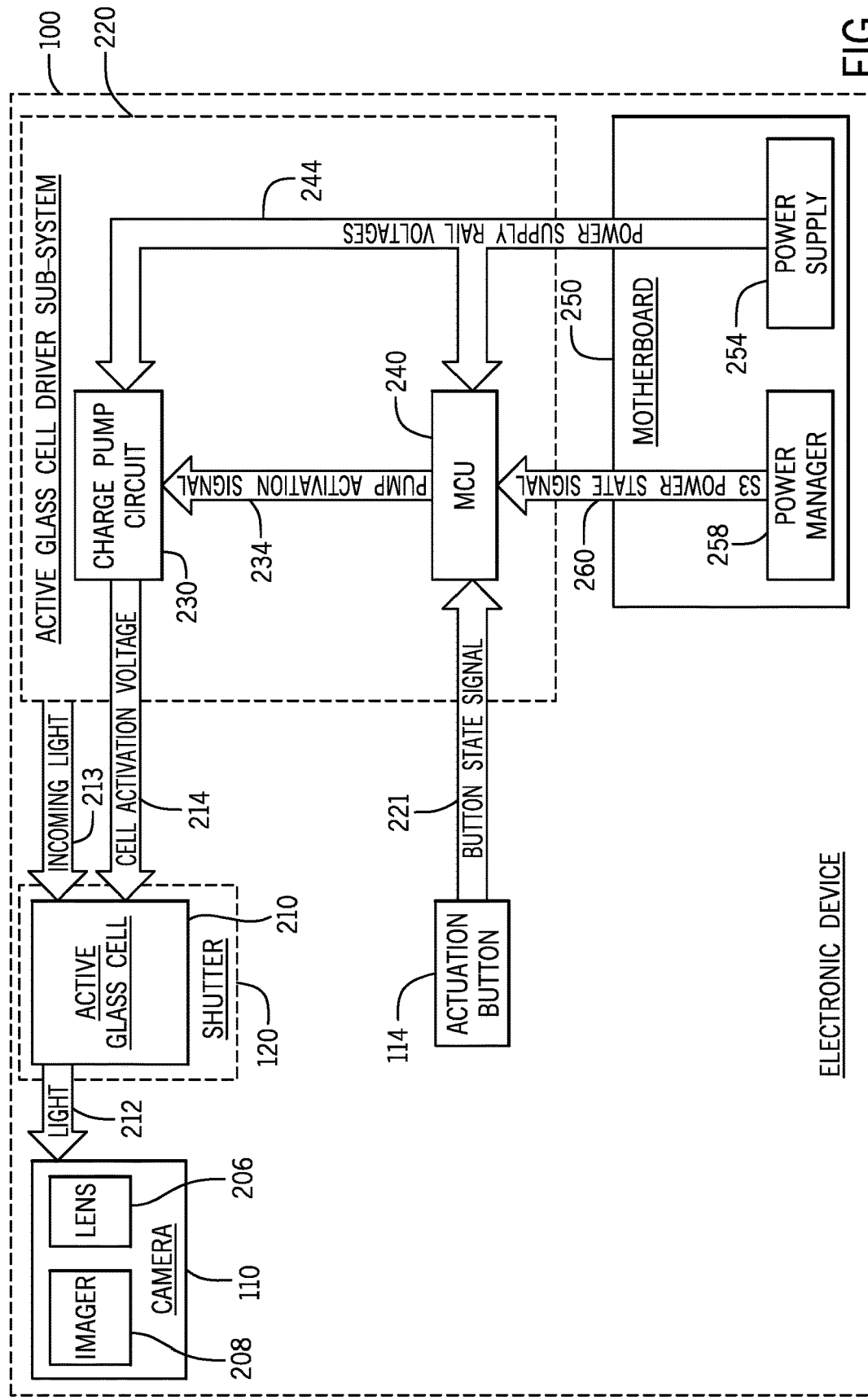
FIG. 2 is an electrical schematic diagram of the electronic device of FIG. 1 according to an example implementation.

FIG. 2 is an electrical schematic diagram of the electronic device 100 in accordance with example implementations. As shown, in accordance with example implementations, the camera 110 may contain an image sensor, or imager 208; and optics, such as a lens 206, to focus images on the imager 208 for purposes of acquiring raw image data for the camera 110. Moreover, in accordance with example implementations, the transmission of light 213 through the lens 206 (and thus, the ability of the camera 110 to acquire images) may be controlled by an active glass cell 210, which may be disposed, for example, between the lens 206 and the opening 112 (see FIG. 1) in the bezel 140. The active glass cell 210 has two states: an opaque state, a default state, in which the active glass cell 210 is opaque and correspondingly inhibits, or blocks, the incoming light 213 from the lens 206; and a transparent state in which light 212 passes through to the lens, as depicted in FIG. 2. In the opaque state, the active glass cell 210 thus effectively disables operation or use of the camera 110. The active glass cell 210, when transparent, enables operation or use of the camera 110 to acquire images within the field of view established by the focal length of lens 206.

In accordance with example implementations, when no power or insufficient power is applied to the supply rail of the active glass cell 210, the active glass cell 210 is placed in a default, opaque state. Conversely, when the appropriate supply voltage is applied to the supply rail of the active glass cell 210, the active glass cell 210 is placed in the transparent state. It is noted that during power state transitions, the power that is supplied to the active glass cell 210 may potentially be at an undetermined level, thereby potentially placing the active glass cell 210 in an undetermined or unknown state during the power state transitions, if not for the features that are described herein.

In accordance with example implementations, the electronic device 100 includes an active glass cell driver sub-system 220, which supplies a cell activation voltage 214, i.e., a supply rail voltage, to the active glass cell 210. The cell activation voltage 214 may exceed the supply rail voltages that are supplied to other components of the electronic device 100. As such, in accordance with some implementations, the electronic device 100 includes a charge pump circuit 230, which receives one or multiple supply rail voltages 244 (used for other components of the electronic device 100). The charge pump circuit 230 and boosts the supply rail voltage 244 to produce the larger cell activation voltage 214 that is furnished to the active glass cell 210, for purposes of placing the active glass cell 210 in its transparent state. The active glass cell 210, in accordance with example implementations, defaults to an opaque state when power is removed from the cell 210 (i.e., when the cell activation voltage 214 is not provided to the cell 210).

For purposes of controlling when the cell activation voltage 214 is provided to the active glass cell 210 (and thus, controlling when the active glass cell 210 is transparent or opaque), the charge pump circuit 230 receives a pump activation signal 234, which is provided by a microcontroller unit (MCU) 240 of the active glass cell driver sub-system 220. In this manner, the MCU 240, in accordance with example implementations, selectively asserts, or drives high, the activation signal 234 to place the active glass cell 210 in the transparent state based on 1) the state of the button 114 and 2) the state of a power state signal 260 that is provided by a power management controller, or power manager 258, of the electronic device 100. In general, the MCU 240 responds to the detection of a change in state of the button 114 (via a button state signal 221) for purposes of toggling the state of the active glass cell 210. In this manner, when the MCU 240 determines that a user has depressed the button 114 (by monitoring the button state signal 221 or by responding to an interrupt triggered by state change of the signal 221, for example), the MCU 240 toggles the state of the activation signal 234 to correspondingly toggle the state of the active glass cell 210. The MCU 240 may be powered via one or multiple supply rail voltages 244.

In accordance with example implementations, the MCU 240 includes one or multiple CPU cores and a memory. The memory may contain volatile and/or non-volatile memory storage devices that store data as well as machine executable instructions (i.e., "software") that when executed by the CPU core(s) of the MCU 240, cause the MCU 240 to perform the techniques that are described herein. The MCU 240 may be replaced by a non-processor-based circuit, such as an application specific integrated circuit (ASIC) or a field programmable gate array (FPGA), in accordance with further example implementations.

In accordance with example implementations, the power manager 258 controls the power states of the electronic device 100. As an example, in accordance with some implementations, the electronic device 100 may be a processor-based device that has power states as defined in the Advanced Configuration and Power Interface (ACPI) specification. In this manner, in the S0 power state, the electronic device 100 is fully powered up (i.e., the CPU(s) and other components of the device 100 are fully powered up) and has the largest associated power consumption. The S1, S2 and S3 power states are sleep states in which the electronic device 100 consumes progressively less power (the S1 power state has a higher power consumption than the S2 power state, and so forth). The ACPI also defines an S4 power state, which is a hibernation state; an S5 power state, which corresponds to a soft off for the electronic device; and a G3 power state in which the electronic device 100 is completely powered off and consumes no power.

In accordance with some implementations, the power state signal 260 may be an S3 power state signal, which is deasserted (driven low, for example) for purposes of indicating that the electronic device 100 is in the S4 or S5 power state or indicating complete power loss; and the S3 signal is asserted (driven high, for example) otherwise. Therefore, by monitoring the edge transitions of the power state signal 260, the MCU 240 may determine whether the electronic device 100 is transitioning to or from the S0 power state.

As depicted in FIG. 2, in accordance with some implementations, the power manager 258 may be disposed on a motherboard 250 of the electronic device 100; and other components (one or multiple central processing units (CPUs), a power supply 254 (providing the power supply rail voltages 244, and so forth) may be disposed on the motherboard 250.

Figure 3:
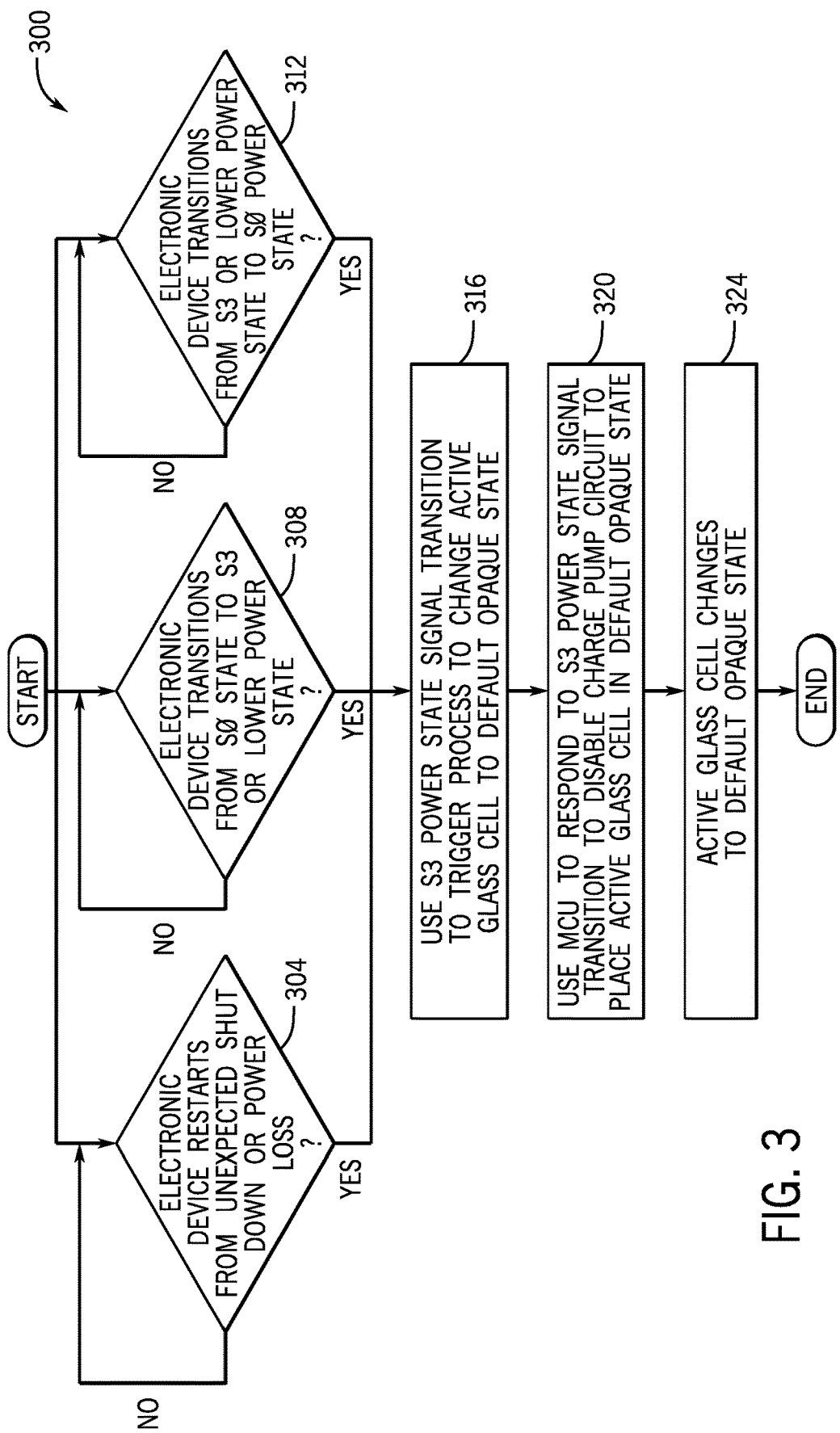
FIGS. 3 and 8 are flow diagrams depicting techniques to control use of a camera of an electronic device according to example implementations.

Referring to FIG. 3 in conjunction with FIG. 2, in accordance with some implementations, the MCU 240 may perform a technique 300 that is depicted in FIG. 3 for purposes of controlling the transmissivity of the active glass cell 210. Pursuant to the technique 300, upon any of the following, the MCU 240 places the active glass cell 210 in the opaque state: the electronic device 100 restarts from an unexpected shut down or power loss (decision block 304); the electronic device 100 transitions from the S0 state to the S3 state or lower power state (decision block 308); or the electronic device 100 transitions from the S3 or lower power state to the S0 power state (decision block 312). Upon one of these events, the power state signal transition is used (block 316) to trigger a process to change the active glass cell 210 to its default opaque state. In this manner, the MCU 240 is used (block 320) to respond to the S3 power state signal transition to disable the charge pump circuit 230 for purposes of placing the active glass cell 210 in its default, opaque state. Accordingly, the active glass cell 210 changes to its default, opaque state, pursuant to block 324.

Figure 4:
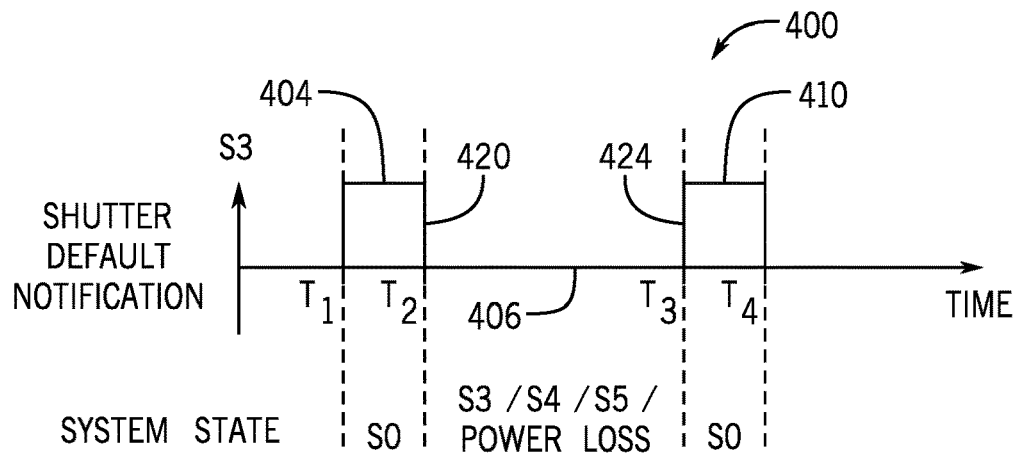
FIG. 4 is a waveform illustrating a power state signal of the electronic device of FIG. 1 according to an example implementation.

FIG. 4 is a waveform 400 of the S3 power state signal in accordance with example implementations. For this example, from times T1 to T2, the S3 power state signal is asserted (i.e., driven high, as indicated at reference numeral 404); and at time T2, the S3 power state signal has a falling, or negative going transition 420. In other words, at time T2, the S3 power state signal transitions from its asserted state to a deasserted state, as depicted at reference numeral 406. From time T2 to time T3, the electronic device 100 remains in the S3, S4 or S5 state or is completely powered off; and at time T3, the S3 power state signal undergoes a positive going, or rising, transition 424 to its asserted state, as depicted at reference numeral 410. In accordance with example implementations, the MCU 240 responds to both the falling 420 and rising 424 edges of the S3 power state signal to correspondingly control the transmissivity state of the active glass cell 210 to ensure that the cell 210 is placed in its default, opaque state upon one of these occurrences.

Thus, the MCU 240 controls the active glass cell 210 to place the cell 210 in its opaque state in response to the MCU 240 detecting a power state transition. In accordance with example implementations, the MCU 240 operates independently, or autonomously, with respect to the CPU(s) and operating system (OS) of the electronic device (other than responding to a power state transition). Therefore, the control of the active glass cell 210 by the MCU 240, in accordance with example implementations, is independent of the CPU(s) of the electronic device and independent of the operating system (OS) of the electronic device. In this manner, in accordance with example implementations, the instructions that are executed by the MCU 240 are contained within the MCU's internal manner; and the MCU 240 does not communicate with components of the electronic device (other than receiving the power state signal and furnishing the cell activation signal to the charge pump circuit, as described herein) As such, the MCU 240 and the control of the active glass cell, as described herein, are immune from being the subject of security attack (a malware attack, an attack initiated by a remote hacker, and so forth).

Figure 5A:
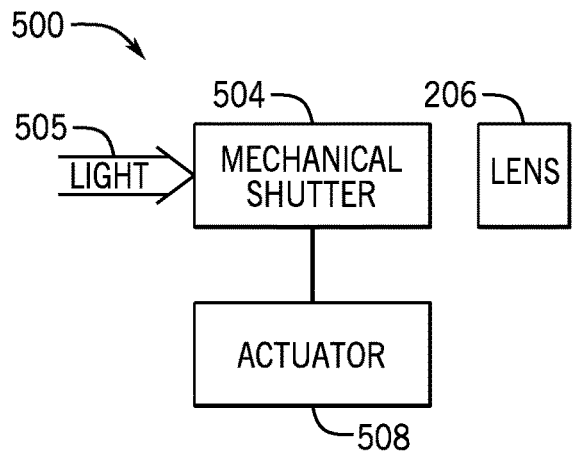
FIGS. 5A, 5B and 5C illustrate shutter systems for an electronic device according to example implementations.
Figure 5B:
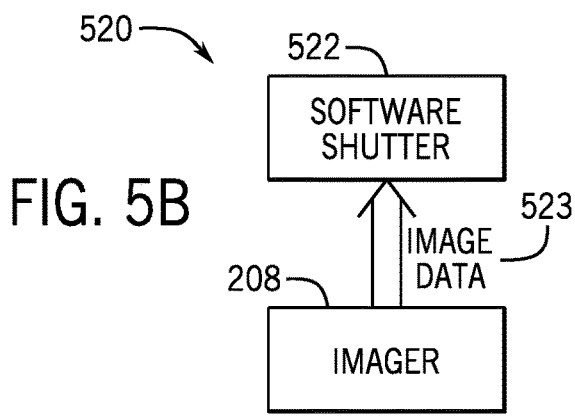
Figure 5C:
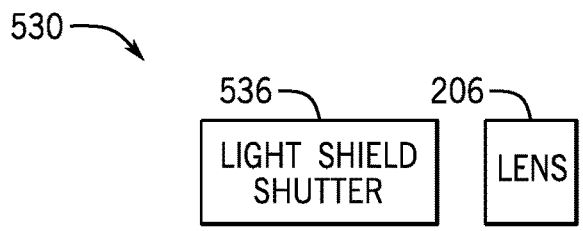

Other variations are contemplated, which are within the scope of the appended claims. For example, in accordance with further example implementations, the operation or use of the camera may be controlled by components other than an active glass cell. For example, FIG. 5A depicts a shutter system 500 in which a mechanical shutter 504 controls whether or not incoming light 505 passes through the lens 206 of a camera. For this example, the shutter system 500 may include an actuator 508 which may control the open or closed state of the mechanical shutter 508 to correspondingly control whether the camera is in a privacy or non-privacy mode of operation. As another example, FIG. 5B depicts a shutter system 520 formed from a software shutter 522 that is controlled by the execution of machine executable instructions. As an example, the software shutter 522 may disable or enable a driver that reads the image data acquired by the imager 208 of the camera. As yet another example, FIG. 5C depicts a shutter system 530 that includes a light shield shutter 536.

Figure 6:
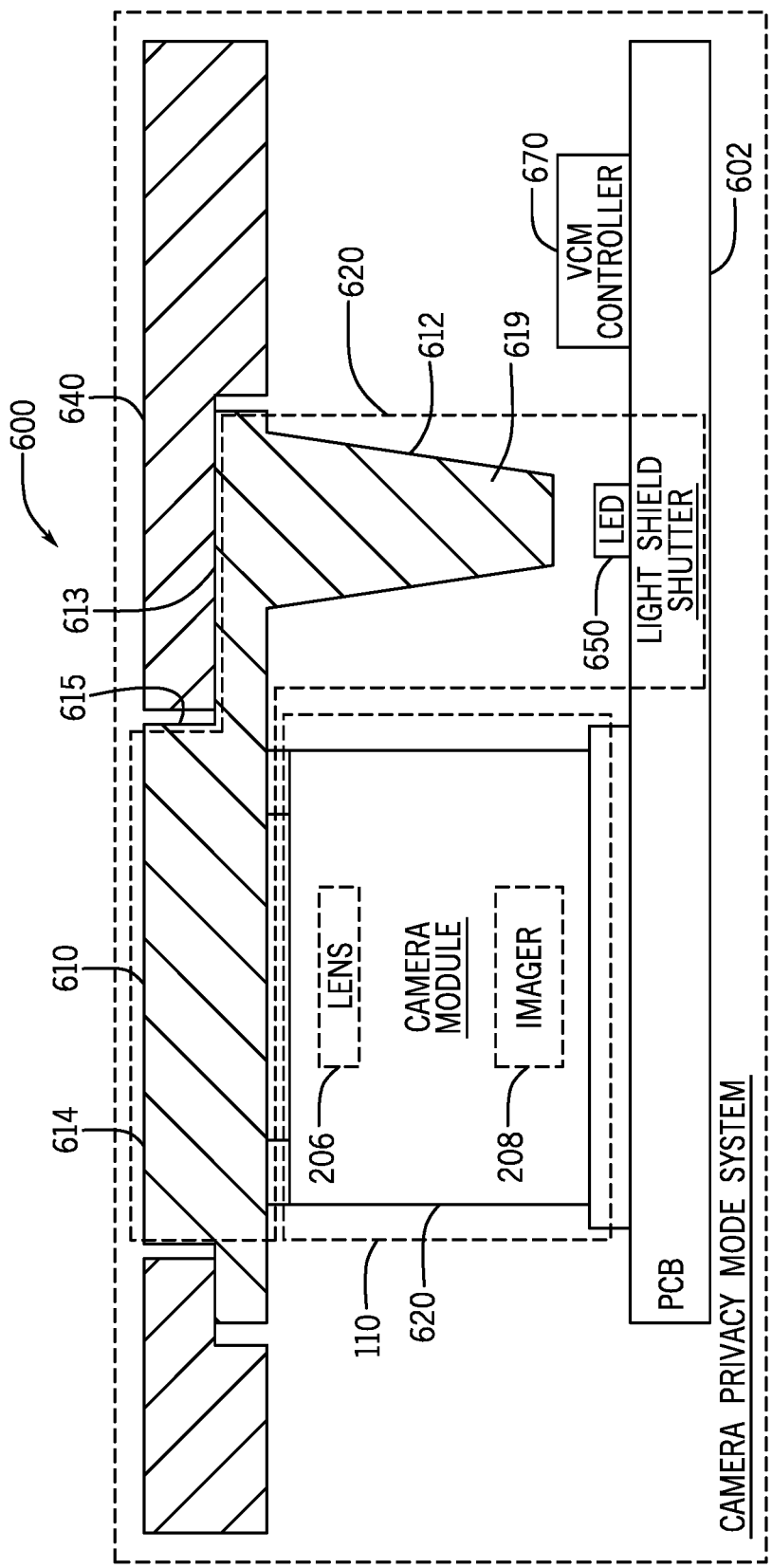
FIGS. 6 and 7 are schematic diagrams of light shield shutters according to example implementations.

More specifically, referring to FIG. 6, in accordance with example implementations, the electronic device 100 may include a camera privacy mode system 600 that includes a light shield shutter 620. The light shield shutter 620 may include one or multiple light sources, such as one or multiple light emitting diodes (LEDs) 650 (one LED 650 being depicted in FIG. 6). The camera 110 may include a camera module 620, which is a discrete package that contains the imager 208; optics, including the lens 206; and various other components, such as a voice coil motor (VCM) to focus the camera 110 by charging the focal length of the lens 206. The LED 650, a VCM controller 670 and the camera module 620 may be mechanically and electrically mounted to a printed circuit board (PCB) 602.

In accordance with some implementations, the light shield shutter 620 may include a light diffuser, or light pipe 610, for purposes of directing, or guiding light from the LED 650 so that the light passes through the lens 206 to the imager 208. In this manner, the light pipe 610, in general, refers to a structure, or optical guide, for directing, or guiding light. The light pipe 610 may be mounted to an interior surface 613 of a bezel 640 and may include a first portion 612 that extends orthogonally away from the bezel 640 so that an end 619 of the portion 612 is suspended above the LED 650 to received light emitted by the LED 650. The light pipe 610, in accordance with example implementations, further includes a second portion 614, which is integral with the first portion 612 and extends over the lens 206 between the lens 2064 and a lens opening 615, which, for this implementation, is formed in the bezel 640.

During the non-privacy mode of operation, the LED 650 remains off, and the second portion 614 of the light pipe 610 is optically transparent, which allows the camera 110 to acquire images within its field of view. During the privacy mode of operation, the LED 650 is turned on, and the light pipe 610 diffuses the light from the LED 650 to form a light barrier so that the imager 208 is fully or partially saturated by the light produced by the LED 650.

Figure 7:
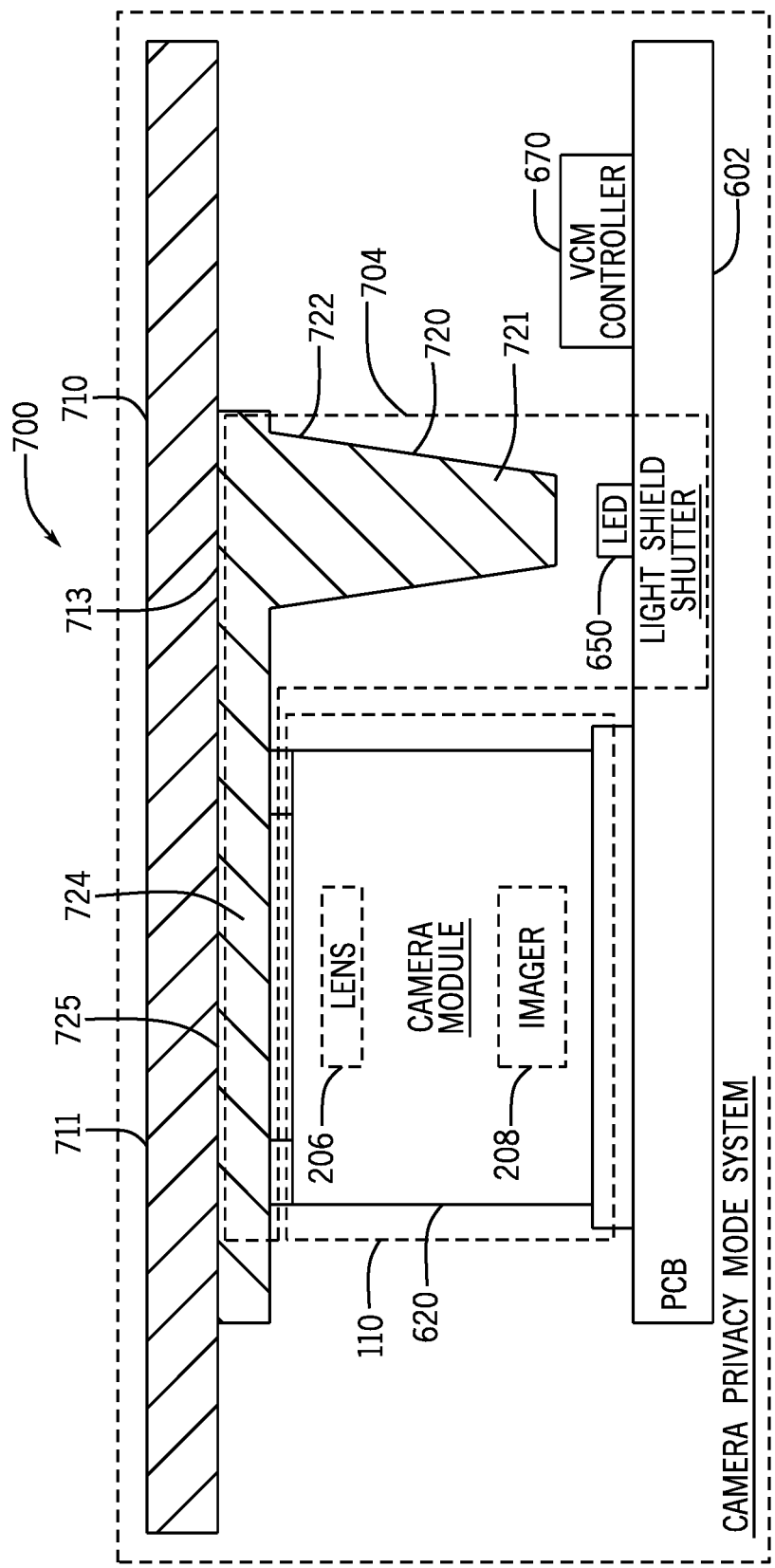

Other light shield shutters may be used, in accordance with further example implementations. For example, FIG. 7 depicts a camera privacy mode system 700 in accordance with further example implementations. For this example implementation, the electronic device 100 has a glass display screen window 710 and includes a region 711 that extends over the lens 206 to form the lens opening for the camera. The system 700 includes a light shield shutter 704 that includes a light pipe 720 that has a first portion 722, which has an end 721 near the LED 650 to guide the light from the LED 650. The light pipe 720 also includes a second portion 724 that is integral with the first portion 722 and extends over the lens 206. The second portion 724 may be mounted (laminated, for example) to an inner surface 725 of the display window 710. Similar to the camera privacy mode system 600 of FIG. 6, the LED 650 of the camera privacy mode system 600 is turned to shutter the camera 110.

As examples of further implementations of light shield shutters, a light shield shutter may not include a light pipe, or diffuser. In this manner, the LED 650 may be oriented so that a field of view of the light from the LED 650 overlaps the field of view of the camera 110. As another example, the LED 650 may be oriented so that the light from the LED 650 is oriented to produce light into the imager 208.

Figure 8:
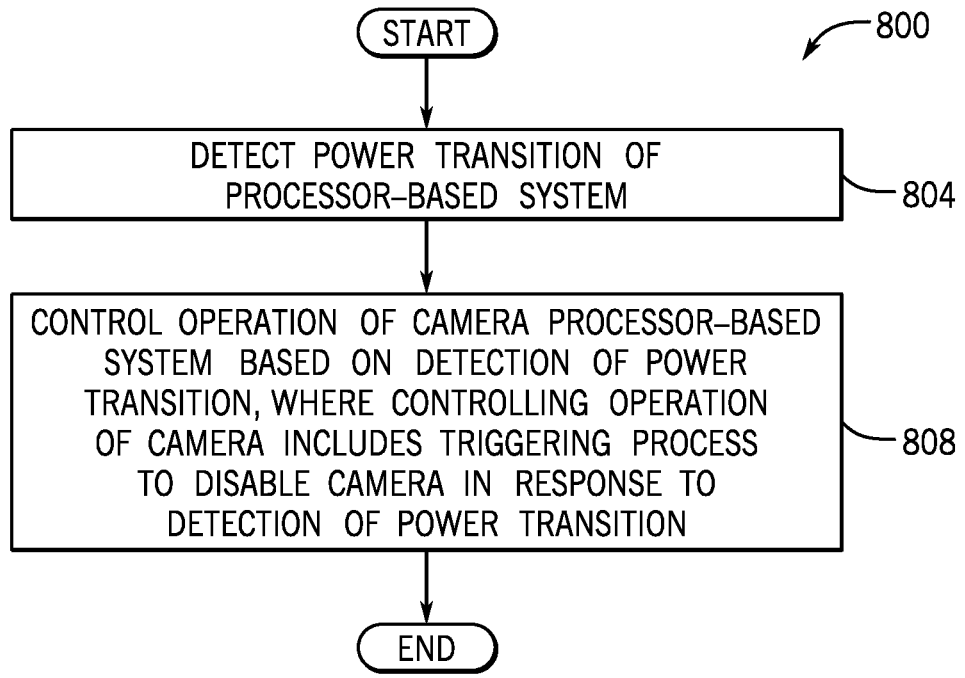

Thus, referring to FIG. 8, in accordance with example implementations, a technique 800 includes detecting (block 804) a power transition of a processor-based system. The technique 805 includes controlling (block 808) operation of a camera of the processor-based system based on the detection of the power transition, where controlling the operation of the camera includes triggering a process to disable the camera in response to the detection of the power transition.

Figure 9:
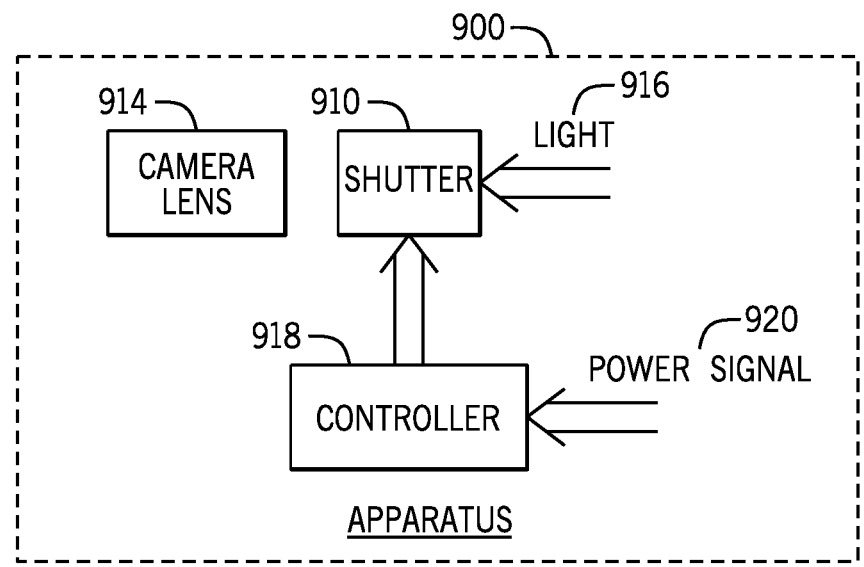
FIGS. 9 and 10 are schematic diagrams of apparatuses to control use of a camera according to example implementations.

More specifically, referring to FIG. 9, in accordance with example implementations, an apparatus 900 includes a shutter to control light through a camera lens 914 and a controller 918. The controller 918 receives a power signal 920 representing a power state of an electronic device, and the controller controls the shutter 910 in response to the power signal 920.

Figure 10:
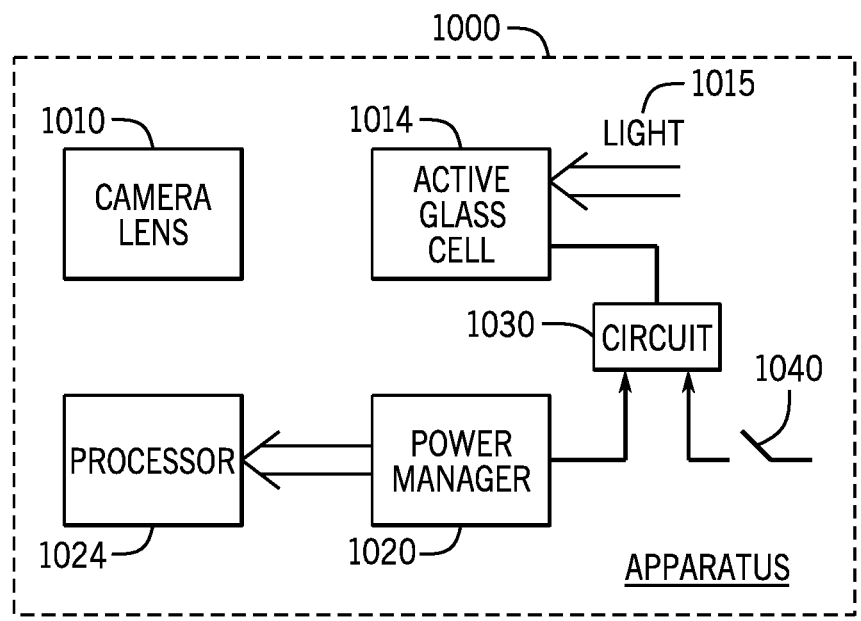

Referring to FIG. 10, more specifically, in accordance with example implementations, an apparatus 1000 includes a camera lens 1010, an active glass cell 1014 and a switch 1020 to toggle the active glass cell 1014 between a first state to block transmission of light 1015 through a camera lens 1010 and a second state to allow transmission of light 1015 through the camera lens 1010. The apparatus 1000 includes a processor 1024 that has a plurality of associated power states and a power manager 1020. The power manager 1020 provides a signal representing a current power state associated with the processor 1024. The apparatus 1000 further includes a circuit 1030 to control whether the active glass cell 1014 is in the first state and whether the active glass cell 1014 is in the second state based on a state of the switch 1020 and the signal provided by the power manager 1020.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. A method comprising:
   detecting a power transition of a processor-based system, wherein the detection of the power transition comprises detecting a transition of a power state signal that is responsive to a transition of the processor-based system between a sleep state and a power on state; and
   controlling an operation of a camera of the processor-based system based on the detection of the power transition, wherein controlling the operation of the camera comprises disabling the camera in response to the detection of and during the power transition.

2. The method of claim 1, further comprising controlling a state of a cell positioned to regulate a view of the camera, wherein disabling the camera comprises changing a state of the cell to opaque in response to the detection of the power transition.

3. The method of claim 1, wherein disabling the camera comprises powering off the camera in response to the detection of the power transition.

4. The method of claim 1, further comprising controlling an actuator to regulate a view of the camera, wherein disabling the camera comprises actuating the actuator in response to the detection of the power transition.

5. The method of claim 1, wherein disabling the camera comprises executing machine executable instructions to prevent images acquired by the camera from being processed in response to the detection of the power transition.

6. The method of claim 1, wherein the detection of the power transition comprises detecting a powering up or a powering down of the processor-based system.

7. The method of claim 1, wherein the detection of the power transition comprises detecting a transition from the sleep state to the power on state.

8. The method of claim 1, wherein the detection of the power transition comprises detecting a transition from the power on state to the sleep state.

9. The method of claim 1, wherein the disabling of the camera during the power transition prevents acquisition of a camera image by malware during the power transition.

10. The method of claim 1, comprising:
    activating a charge pump circuit that outputs an activation voltage to a shutter for the camera, wherein the charge pump circuit boosts a power supply voltage to produce the activation voltage, and
    wherein the disabling of the camera comprises disabling the charge pump circuit.

11. The method of claim 1, wherein the sleep state and the power on state are respective Advanced Configuration and Power Interface (ACPI) states.

12. The method of claim 1, wherein the sleep state is an Advanced Configuration and Power Interface (ACPI) S3 state.

13. An electronic device comprising:
    a shutter to control light through a camera lens of a camera; and
    a controller to:
      detect a transition of a power state signal representing a power state of an electronic device, wherein the transition of the power state signal is responsive to a power transition of the electronic device between a sleep state and a power on state; and
      control the shutter in response to the detection of the power state signal to disable the camera during the power transition of the electronic device that is indicated by the transition of the power state signal.

14. The electronic device of claim 13, wherein the shutter comprises an active glass cell.

15. The electronic device of claim 14, wherein the controller is to change a state of the active glass cell to an opaque state to disable the camera.

16. The electronic device of claim 13, wherein the the sleep state is an Advanced Configuration and Power Interface (ACPI) S3 state.

17. The electronic device of claim 13, further comprising:

a charge pump circuit that when activated outputs an activation voltage to the shutter, wherein the charge pump circuit is to boost a power supply voltage to produce the activation voltage, and wherein the disabling of the camera comprises disabling the charge pump circuit.

18. An electronic device comprising:

a camera comprising a camera lens;

an active glass cell having a first state to block transmission of light through the camera lens and a second state to allow transmission of light through the camera lens;

a switch to toggle the active glass cell between the first state and the second state;

a processor associated with a plurality of power states;

a power manager to transition the processor among the plurality of power states and provide a power state signal representing a current power state among the plurality of power states associated with the processor; and a controller to set the active glass cell in the first state in response to detecting a transition of the power state signal that is responsive to a power transition of the electronic device between a sleep state and a power on state, wherein the setting of the active glass cell in the first state disables the camera during the power transition.

19. The electronic device of claim 18, wherein the disabling of the camera during the power transition prevents acquisition of a camera image by malware during the power transition.

20. The electronic device of claim 18, wherein the sleep state is an Advanced Configuration and Power Interface (ACPI) S3 state.

\* \* \* \* \*